(12) United States Patent
Kuwabara (10) Patent No.: US 12,439,155 B2
(45) Date of Patent: Oct. 7, 2025

(54) DISPLAY CONTROL APPARATUS AND CONTROL METHOD

(71) Applicant: CANON KABUSHIKI KAISHA, Tokyo (JP)

(72) Inventor: Yasuhiro Kuwabara, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 59 days.

(21) Appl. No.: 17/815,145

(22) Filed: Jul. 26, 2022

(65) Prior Publication Data

US 2022/0368838 A1 Nov. 17, 2022

Related U.S. Application Data

(63) Continuation of application No. PCT/JP2021/000616, filed on Jan. 12, 2021.

(30) Foreign Application Priority Data

Jan. 29, 2020 (JP) ................................ 2020-012905

(51) Int. Cl.
*H04N 23/67* (2023.01)
*H04N 23/61* (2023.01)
*H04N 23/63* (2023.01)

(52) U.S. Cl.
CPC ......... *H04N 23/675* (2023.01); *H04N 23/635* (2023.01)

(58) Field of Classification Search
None
See application file for complete search history.

(56) References Cited

U.S. PATENT DOCUMENTS

| 2004/0036792 | A1 | 2/2004 | Moriya |
| 2014/0307918 | A1 | 10/2014 | Tanaka |
| 2016/0295120 | A1* | 10/2016 | Ota ..................... H04N 23/667 |
| 2018/0091722 | A1* | 3/2018 | Fukushima ............ H04N 23/63 |
| 2018/0106982 | A1* | 4/2018 | Uemura ............... H04N 23/675 |
| 2022/0019282 | A1* | 1/2022 | Zhou ..................... G06F 1/3265 |

FOREIGN PATENT DOCUMENTS

| CN | 1893561 A | 1/2007 |
| CN | 102761691 A | 10/2012 |
| CN | 104104860 A | 10/2014 |
| EP | 2793166 A2 | 10/2014 |
| JP | 2009037043 A | 2/2009 |

(Continued)

*Primary Examiner* — Samuel D Fereja
(74) *Attorney, Agent, or Firm* — Canon U.S.A., Inc. IP Division (57) ABSTRACT

A display control apparatus includes an acquisition unit configured to acquire information about an in-focus position on a live view image, and a display control unit configured to perform control to display an item indicating the in-focus position on the live view image, based on the information acquired by the acquisition unit. The display control unit performs control to display a first item at a first in-focus position at which focus is continuously achieved, in a display form having higher visibility than in a display form of a second item to be displayed at a second in-focus position at which focus is not achieved at least last time, the first in-focus position and the second in-focus position being positions at which focus is currently achieved.

12 Claims, 5 Drawing Sheets

(56) References Cited

FOREIGN PATENT DOCUMENTS

| | | | |
|---|---|---|---|
| JP | 2009088722 | A | 4/2009 |
| JP | 2009198887 | A | 9/2009 |
| JP | 2014207622 | A | 10/2014 |
| JP | 2016167088 | A | 9/2016 |
| JP | 2018054762 | A | 4/2018 |
| JP | 2019020508 | A | 2/2019 |
| JP | 2020012905 | A | 1/2020 |

\* cited by examiner

DISPLAY CONTROL APPARATUS AND CONTROL METHOD

CROSS-REFERENCE TO RELATED APPLICATIONS

This application is a Continuation of International Patent Application No. PCT/JP2021/000616, filed Jan. 12, 2021, which claims the benefit of Japanese Patent Application No. 2020-012905, filed Jan. 29, 2020, both of which are hereby incorporated by reference herein in their entirety.

BACKGROUND

Technical Field

The aspect of the embodiments relates to a display control apparatus and a control method thereof, and particularly relates to a technique of displaying an AF frame.

Background Art

There is a technique of changing a display form of an in-focus frame in order to prevent visibility from being reduced by display indicating an in-focus position. PLT 1 discusses displaying one AF frame to surround a face in a case where the face is detected, and otherwise displaying an AF frame at each position where a focus is detected.

In the method of PLT 1, in a case where a face is not detected, the position of the displayed AF frame is changed each time the detected in-focus position changes, and therefore, in a case where the number of distance measurement points increases, switching between display and non-display of the AF frame can look like flicker to a user.

CITATION LIST

Patent Literature

PTL1: Japanese Patent Application No. 2020-012905

SUMMARY

A display control apparatus includes an acquisition unit configured to acquire information about an in-focus position on a live view image, and a display control unit configured to perform control to display an item indicating the in-focus position on the live view image, based on the information acquired by the acquisition unit, wherein the display control unit performs control to display a first item at a first in-focus position at which focus is continuously achieved, in a display form having higher visibility than in a display form of a second item to be displayed at a second in-focus position at which focus is not achieved at least last time, the first in-focus position and the second in-focus position being positions at which focus is currently achieved.

Further features of the disclosure will become apparent from the following description of exemplary embodiments with reference to the attached drawings.

DESCRIPTION OF THE EMBODIMENTS

An exemplary embodiment of the disclosure will be described below with reference to the drawings.

Figure 1A:
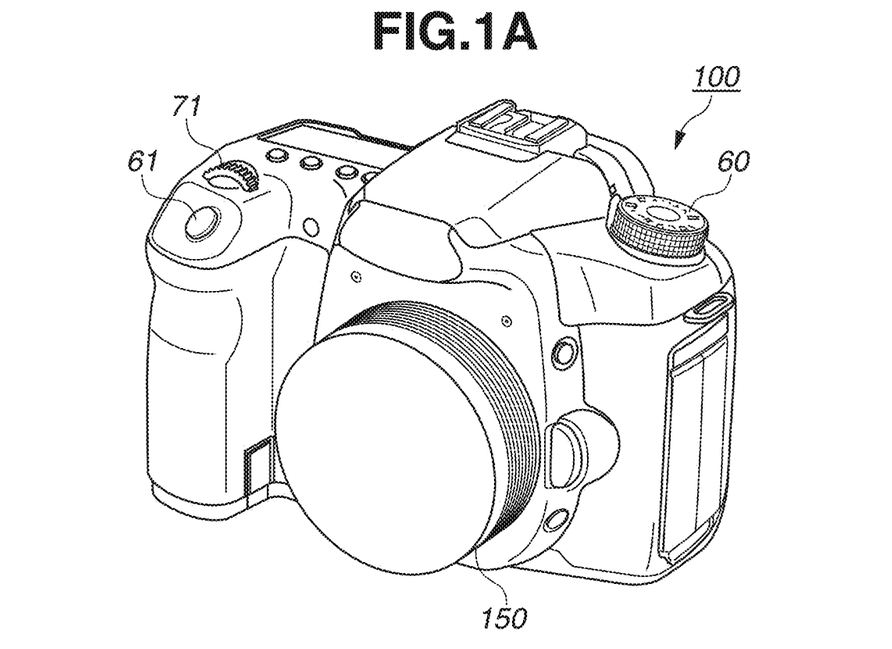
FIG. 1A is an external view of a digital camera as an example of an apparatus to which a configuration of an exemplary embodiment of the disclosure is applicable.
Figure 1B:
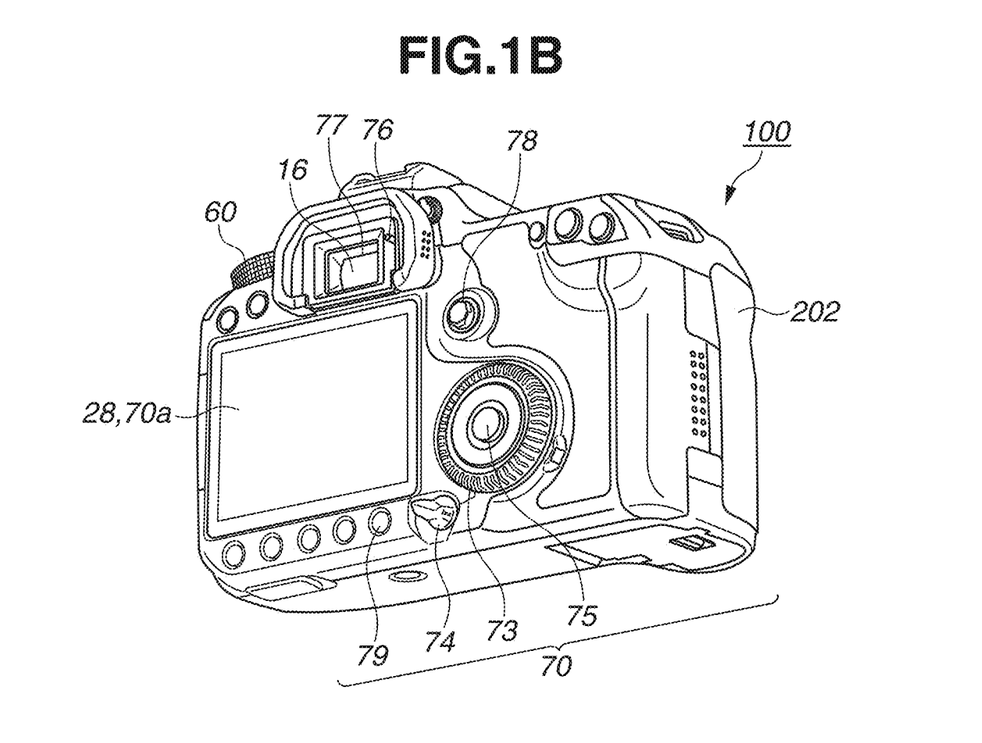
FIG. 1B is an external view of the digital camera as an example of an apparatus to which the configuration of the exemplary embodiment of the disclosure is applicable.
Figure 2:
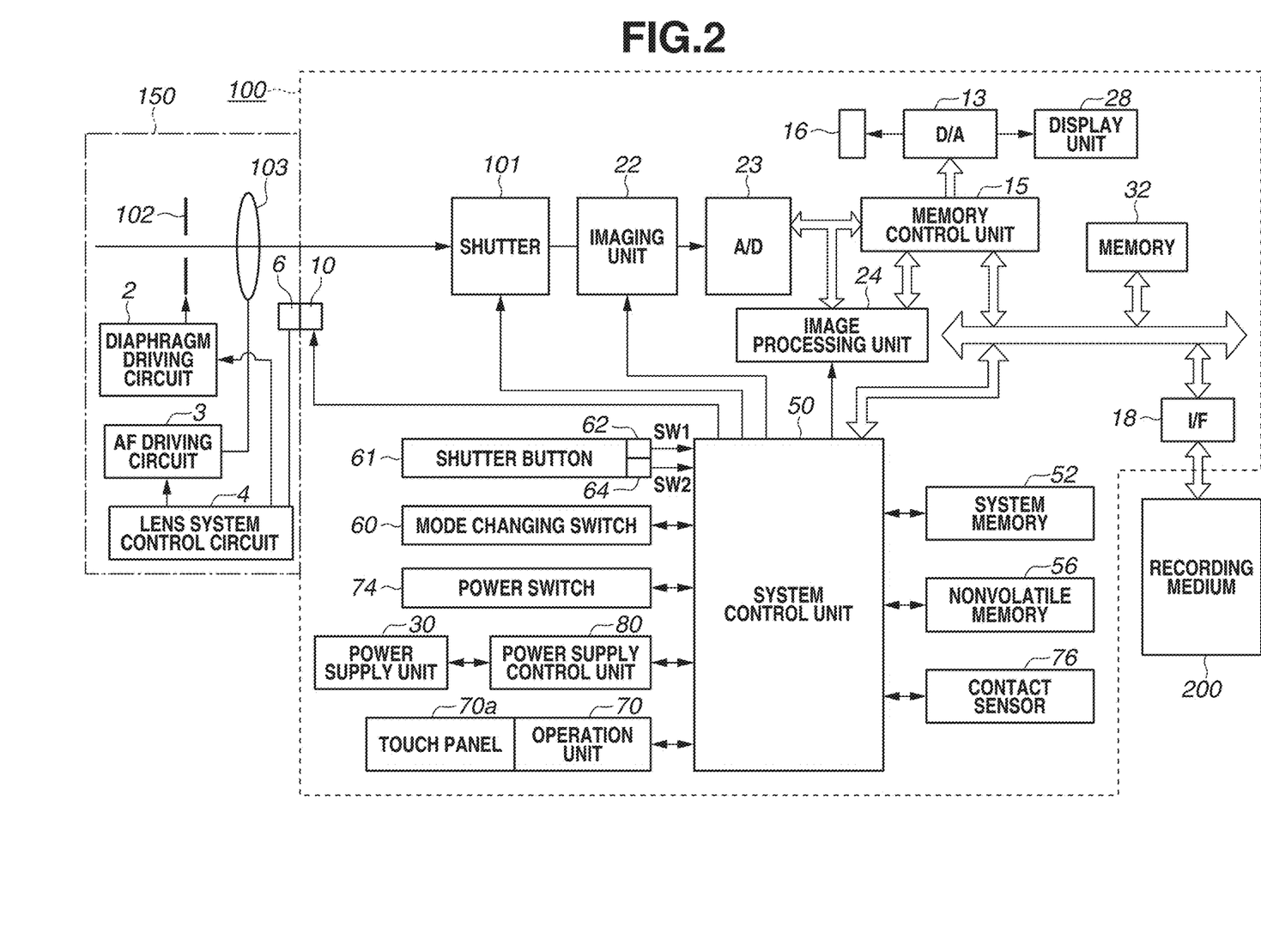
FIG. 2 is a block diagram illustrating a configuration example of the digital camera as the example of the apparatus to which the configuration of the exemplary embodiment of the disclosure is applicable.

FIGS. 1A and 1B illustrate an external view of a digital camera 100 as an example of a display control apparatus of the disclosure, and FIG. 2 is a block diagram illustrating a configuration example of the digital camera 100 as the example of the display control apparatus of the disclosure.

In FIG. 1B, a display unit 28 is a display unit that displays an image and various kinds of information. An in-finder liquid crystal unit 16 is a display unit provided inside a finder, and displays an image and various kinds of information as with the display unit 28. A touch panel 70a is provided integrally with the display unit 28. The touch panel 70a can detect a touch operation on a display surface of the display unit 28, and thus a touch operation can be intuitively performed on an item or a subject displayed on the display unit 28.

A lens unit 150 is a lens unit having a lens.

A shutter button 61 is an operation unit for providing an image capturing instruction. A mode changing switch 60 is an operation unit for changing between various modes. An operation unit 70 is an operation unit consisting of operation members, such as various switches, buttons, and a touch panel, for accepting various operations from a user. A power switch 74 is a push button for changing between power-on and power-off. A main electronic dial 71 is a rotation operation member, and setting values, such as a shutter speed and an aperture, can be changed by turning this main electronic dial 71. A sub-electronic dial 73 is a rotation operation member for performing movement of a selection frame, image forwarding, and the like. A SET button 75 is a push button to be used mainly for determination of a selected item. A menu button 79 is a button for displaying a menu screen. In the menu screen, settings can be made related to image capturing, such as autofocus or automatic focusing (AF) and the number of images to be captured, and settings related to recording, and settings related to display.

The in-finder liquid crystal unit 16 described above can be seen by looking through a finder 77. When the user attempts to look through the finder 77, a contact sensor 76 located below the finder 77 detects a contact of an object, so that display on the in-finder liquid crystal unit 16 is enabled. The contact sensor 76 is a detection unit that detects whether an object has contacted, and the contact sensor 76 detects a change in capacitance between the object and the sensor, and detects whether the object has contacted, based on whether the amount of the change exceeds a threshold. The method of detecting the contact of the object using the contact sensor 76 is not limited to the capacity-basis, and may be of a type that emits infrared light and determines whether an object is nearby based on the power of the reflected infrared light, and the type is not limited to the one described above.

A display changing button 78 is a button for changing between display on the in-finder liquid crystal unit 16 and display on the display unit 28.

A cover 202 is a cover for a recording medium slot. In this figure, the cover 202 is in a closed state. The recording medium slot is a slot for inserting a recording medium, such as a memory card or a hard disk. The recording medium can communicate with the digital camera 100, and enables recording and reproduction.

FIG. 2 is a block diagram illustrating a configuration example of the digital camera 100 according to the present exemplary embodiment. In FIG. 2, an image capturing lens 103 is a lens group including a zoom lens and a focus lens. A single focus lens is illustrated as an example of the lens unit 150. Examples of the single focus lens include a wide-angle lens, a standard lens, and a telephoto lens. The lens 103 is usually composed of a plurality of lenses, but only one lens is illustrated here for simplicity. A communication terminal 6 is a communication terminal for the lens unit 150 to communicate with a digital camera 100 side. The lens unit 150 communicates with a system control unit 50 via the communication terminal 6 and a communication terminal 10, and performs focusing by controlling a diaphragm 102 via a diaphragm driving circuit 2 using a lens system control circuit 4 disposed inside, and displacing the position of the lens 103 via an AF driving circuit 3. A shutter 101 is a shutter having an aperture function. An imaging unit 22 is an image sensor configured of a charge coupled device (CCD) or complementary metal oxide semiconductor (CMOS) sensor or the like that converts an optical image into an electrical signal. An analog to digital (A/D) converter 23 converts an analog signal into a digital signal. The A/D converter 23 is used to convert an analog signal output from the imaging unit 22 into a digital signal.

An image processing unit 24 performs predetermined pixel interpolation, resize processing such as reduction, and color conversion processing, for data from the A/D converter 23 or data from a memory control unit 15. Further, the image processing unit 24 performs predetermined arithmetic processing using image data obtained by imaging, and the system control unit 50 performs exposure control and range-finding control, based on the obtained arithmetic result. Through-the-lens (TTL) type AF processing, automatic exposure (AE) processing, and EF (pre-flash emission) processing are thereby performed. Further, the image processing unit 24 also performs predetermined arithmetic processing using image data obtained by imaging, and performs TTL type automatic white balance (AWB) processing, based on the obtained arithmetic result.

Output data from the A/D converter 23 is directly written in a memory 32 via the image processing unit 24 and the memory control unit 15, or via the memory control unit 15. The memory 32 stores image data obtained by the imaging unit 22 and converted into digital data by the A/D converter 23, and image data for display on the display unit 28 or the in-finder liquid crystal unit 16. The memory 32 has a memory capacity sufficient to store a predetermined number of still images, and a moving image and sound of a predetermined length of time.

Further, the memory 32 also serves as a memory (a video memory) for image display. A digital to analog (D/A) converter 13 converts data for image display stored in the memory 32 into an analog signal, and supplies the analog signal to the display unit 28 or the in-finder liquid crystal unit 16. The image data for display written in the memory 32 is thus displayed by the display unit 28 or the in-finder liquid crystal unit 16 via the D/A converter 13. The display unit 28 displays on a display device such as a liquid crystal display (LCD), based on the analog signal from the D/A converter 13. The digital signals once subjected to AD conversion by the A/D converter 23 and accumulated in the memory 32 are subjected to analog conversion in the D/A converter 13, and sequentially transferred to and displayed on the display unit 28, so that through image display (live view image display) is performed. The in-finder liquid crystal unit 16 functions as an electronic viewfinder by performing processing equivalent to that of the display unit 28. The in-finder liquid crystal unit 16 may be an optical viewfinder instead of the electronic viewfinder. In the case of the optical viewfinder, a display surface is disposed near a focusing screen on a finder optical path, and the display of a subject optical image on the focusing screen and the display on the in-finder liquid crystal can be checked at a time.

A nonvolatile memory 56 is a memory serving as an electrically erasable and recordable recording medium, and, for example, an electrically erasable programmable read-only memory (EEPROM) or the like is used. The nonvolatile memory 56 stores constants, a program, and the like for operating the system control unit 50. The program here is a computer program for executing various flowcharts to be described below in the present exemplary embodiment.

A random access memory (RAM) is used for a system memory 52. Constants, variables, the program read out from the nonvolatile memory 56 for operating the system control unit 50, and the like are loaded into the system memory 52. The system control unit 50 also performs display control or can control display by controlling the memory 32, the D/A converter 13, the display unit 28, and the like.

The mode changing switch 60, the shutter button 61, and the operation unit 70 are operation means for inputting various operation instructions into the system control unit 50. The mode changing switch 60 changes the operation mode of the system control unit 50 to any of a still image recording mode, a moving image capturing mode, an interval image capturing mode, a playback mode, the menu screen, and the like.

A first shutter switch 62 is turned on when the shutter button 61 included in the digital camera 100 is operated halfway, i.e., half-pressed (an image capturing preparation instruction), and the first shutter switch 62 generates a first shutter switch signal SW 1. Operations, such as the AF processing, the AE processing, the AWB processing, and the EF processing, are started by the first shutter switch signal SW 1.

A second shutter switch 64 is turned on when the shutter button 61 is operated completely, i.e., full-pressed (the image capturing instruction), and the second shutter switch 64 generates a second shutter switch signal SW 2. The system control unit 50 starts a series of image processing operations from reading of a signal from the imaging unit 22 to writing of image data into the recording medium 200, based on the second shutter switch signal SW 2.

Operation members of the operation unit 70 have functions assigned thereto, on a scene-by-scene basis, e.g., based on operations for selecting various function icons displayed on the display unit 28, the in-finder liquid crystal unit 16, and the like, so that the operation members act as various function buttons. Examples of the function buttons include, for example, an end button, a return button, an image scroll button, a jump button, a narrowing button, and an attribute changing button. For example, when the menu button is pressed, the menu screen on which various settings can be made is displayed on the display unit 28 or the like. The user can intuitively make various settings, by using the menu screen displayed on the display unit 28 or the like, a four-direction key to be pressed in the up, down, left, and right directions, and the SET button.

A power supply control unit 80 is composed of a battery detection circuit, a direct current to direct current (DC-DC) converter, and a switching circuit for switching between blocks to be energized, and detects attachment/detachment of a battery, a battery type, and a remaining battery level. Further, the power supply control unit 80 controls the DC-DC converter based on a result of the above-described detection and an instruction from the system control unit 50 to supply required voltage to the components including the recording medium 200 for a required time period.

A power supply unit 30 consists of a primary battery, such as an alkaline battery and a lithium battery, a secondary battery, such as a nickel cadmium (NiCd) battery, a nickel metal hydride (NiMH) battery, and a lithium (Li) battery, an alternate current (AC) adapter, or the like. A recording medium interface (I/F) 18 is an interface with the recording medium 200, such as a memory card and a hard disk. The recording medium 200 is a recording medium, such as a memory card, for recording images obtained by imaging, and is configured of a semiconductor memory, an optical disk, a magnetic disk, or the like.

The contact sensor 76 is a sensor for detecting whether an object has contacted the finder 77 of the digital camera 100. This can be used, for example, for display on the display unit 28 when the contact of an object is not detected, and for changing the display destination from the display unit 28 to the in-finder liquid crystal unit 16 when the contact of an objected is detected.

The touch panel 70a capable of detecting contact with the display unit 28 is provided as a member of the operation unit 70. Input coordinates on the touch panel 70a and display coordinates on the display unit 28 are associated with each other. A graphical user interface (GUI) can thereby be configured on a screen displayed on the display unit 28 such that the user feels as if the user can directly operate the screen. The system control unit 50 can detect operations or states described below on the touch panel 70a.

A finger or a pen that has not previously been in touch with the touch panel 70a touches the touch panel 70a. In other words, a touch starts (hereinafter, referred to as "touch-down").

A finger or a pen is being in touch with the touch panel 70a (hereinafter, referred to as "touch-on").

A finger or a pen in touch with the touch panel 70a is being moved (hereinafter, referred to as "touch-move").

A finger or a pen that has been in touch with the touch panel 70a is removed. In other words, a touch end (hereinafter, referred to as "touch-up").

A state where nothing is in touch with the touch panel 70a (hereinafter, referred to as "touch-off").

When a touch-down is detected, a touch-on is simultaneously detected. After the touch-down, unless a touch-up is detected, a touch-on is normally detected continuously. A state where a touch-move is detected is also a state where a touch-on is detected. Even if a touch-on is detected, unless the touch position is not moved, a touch-move is not detected. After a touch-up of all the touched fingers or a pen is detected, the state is changed to a touch-off.

These operations or states and coordinates of a position touched with a finger or a pen on the touch panel 70a are notified to the system control unit 50 via an internal bus. The system control unit 50 determines which operation is performed on the touch panel 70a, based on the notified information. As to a touch-move, a movement direction of a finger or a pen moving on the touch panel 70a can also be determined for each vertical component and each horizontal component on the touch panel 70a, based on a change in the coordinates of the position. When a touch-up is performed after a touch-move of a predetermined distance from a touch-down on the touch panel 70a, a stroke is drawn. An operation of quickly drawing a stroke is referred to as a flick. The flick is an operation of removing a finger from the touch panel 70a after quickly moving the finger for some distance while touching the touch panel 70a, i.e., an operation of flipping the surface of the touch panel 70a. The touch panel 70a may be a touch panel of any of various methods, such as a resistive film method, a capacitance method, a surface acoustic wave method, an infrared method, an electromagnetic induction method, an image recognition method, and an optical sensor method. Some methods detect a touch based on a touch on a touch panel while some other methods detect a touch based on a contact of a finger or a pen to a touch panel, but any of the methods may be employed.

An AF mode in the present exemplary embodiment will be described. In the AF mode, one-shot AF or continuous (servo) AF can be selected. In the one-shot AF, focusing processing is executed in response to a half press of the shutter button 61 at the selected AF position. The one-shot AF is suitable for focusing on a stationary subject. In the continuous AF, a selected subject is tracked, and focus is kept on the subject while the shutter button 61 is half-pressed. The continuous AF is suitable for capturing an image of a moving subject. If a subject is automatically set as a target of the continuous AF, the detected subject (e.g., the face of a person) can be tracked even if the subject is not selected by the user.

Figure 5A:
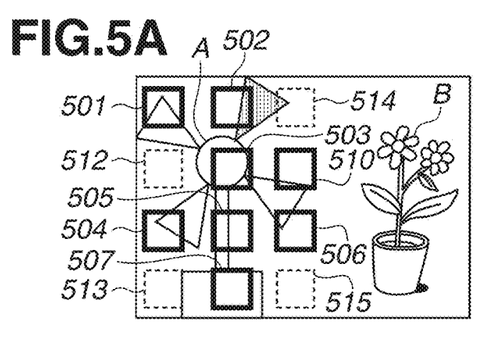
FIG. 5A is a diagram illustrating a display example for describing the exemplary embodiment of the disclosure.

Further, in both of the one-shot AF and the continuous AF, an AF position and an AF subject can be selected by detection of a touch operation by the touch panel 70a, if the touch operation is performed on the display unit 28 displaying a live view image. Alternatively, these can also be selected with an operation member of the operation unit 70. In the present exemplary embodiment, distance measurement points a to t exemplified in FIG. 5H will be described as the distance measurement points, but the number of distance measurement points is only an example, and 45 points or one hundred points or more may be used.

Next, image capturing processing and display processing in the present exemplary embodiment will be described with reference to flowcharts in FIG. 3, FIG. 4A and FIG. 4B. In the following exemplary embodiment, a case where a live view image is displayed on the display unit 28 will be described, but the disclosure is also applicable to a case where a live view image is displayed on the in-finder liquid crystal unit 16.

Figure 3:
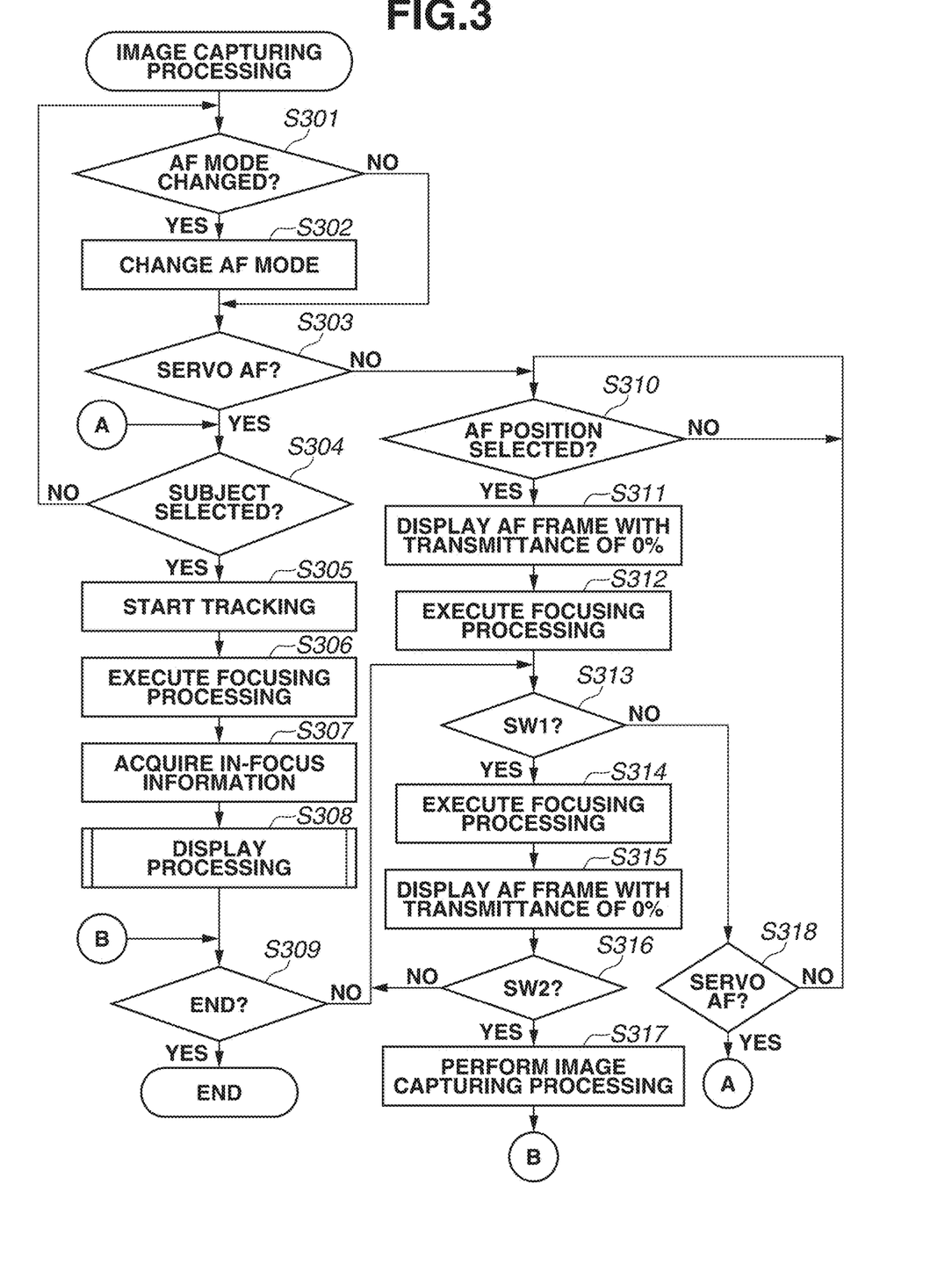
FIG. 3 is a flowchart of image capturing processing in the exemplary embodiment of the disclosure.

FIG. 3 illustrates the image capturing processing in the present exemplary embodiment. This processing starts when the digital camera 100 enters the image capturing mode upon being turned on. The program recorded in the non-volatile memory 56 is loaded into the system memory 52 and executed by the system control unit 50, so that this processing is implemented.

In step S301, the system control unit 50 determines whether an operation of changing the AF mode is performed by the user. In a case where the system control unit 50 determines that the operation of changing the AF mode is performed, the processing proceeds to step S302, otherwise the processing proceeds to step S303.

In step S302, the system control unit 50 changes the AF mode, based on the operation of the user in step S301. For example, in a case where the AF mode is changed from the one-shot AF to the continuous AF, the change is recorded into the memory 32.

In step S303, the system control unit 50 determines whether the currently set AF mode is the continuous AF. In a case where the system control unit 50 determines that the continuous AF is set, the processing proceeds to step S304, otherwise the processing proceeds to step S310.

In step S304, the system control unit 50 determines whether a subject is selected by the user. In a case where the system control unit 50 determines that the subject is selected, the processing proceeds to step S305, otherwise the processing returns to step S301. As described above, in a case where face+tracking priority AF of automatically detecting the face of a person and performing the continuous AF is set, even if the user does not select a subject in the continuous AF, a face is detected without the determination in step S304, and the processing proceeds to step S305. In a case where a subject is already selected, the processing proceeds to step S306.

In step S305, the system control unit 50 starts processing of tracking the subject selected in step S304. In a case where tracking has already been started, the processing proceeds to step S306, without performing the processes in step S304 and step S305.

In step S306, the system control unit 50 executes focusing processing for the subject being tracked. The focusing processing is performed more simply than the focusing processing to be executed in response to the half press of the shutter button 61 described above.

Figure 5B:
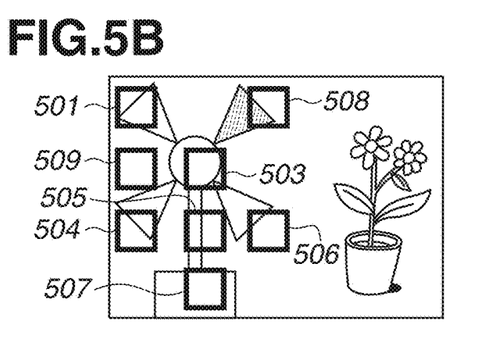
FIG. 5B is a diagram illustrating a display example for describing the exemplary embodiment of the disclosure.
Figure 5C:
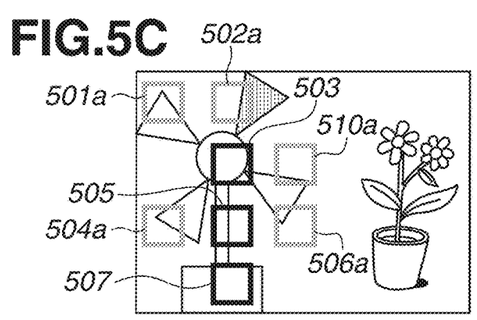
FIG. 5C is a diagram illustrating a display example for describing the exemplary embodiment of the disclosure.
Figure 5D:
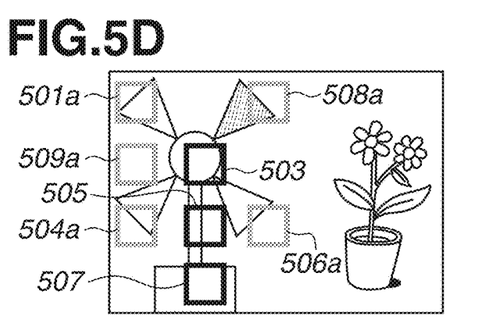
FIG. 5D is a diagram illustrating a display example for describing the exemplary embodiment of the disclosure.

In step S307, the system control unit 50 acquires in-focus information indicating where focus is done in the focusing processing performed in step S306. Suppose a subject A is selected between the subject A and a subject B, in a live view image illustrated in FIGS. 5A to 5F. The subject A indicates an electric fan, and a central portion does not move, but the positions of blade portions move because of rotation. The subject A illustrated in FIG. 5A, FIG. 5C, and FIG. 5E and the subject A illustrated in FIG. 5B, FIG. 5D, and FIG. 5F are different in terms of the timing for image capturing, and the positions of the blades move. At this moment, in-focus frames 501 to 507 and 510 are displayed at positions each detected as the position at which focus is achieved in the immediately preceding process in step S306 in FIG. 5A. A portion (regions 512 to 515) where no in-focus frame is displayed in FIG. 5A indicates a portion where focus is not achieved. The regions 512 to 515 are display for indicating a region, and are not displayed on the live view screen. Further, among the distance measurement points a to t, the positions at which focus is achieved are recorded into the memory 32, as in-focus positions 1 to N in association with the distance measurement points. Alternatively, an in-focus flag may be set for each of the distance measurement points.

In step S308, the system control unit 50 performs the display processing. The display processing will be described below with reference to FIGS. 4A and 4B. The process in step S308 may be executed by performing the processes in step S306 and step S307 in time with the update of the display frame of the display unit 28, or may be executed each time the processes in step S306 and step S307 are performed.

In step S309, the system control unit 50 determines whether to end the image capturing processing. The image capturing processing is ended by turning off the power, changing to the playback mode, or displaying the menu screen. In a case where the system control unit 50 determines to end the image capturing processing, the image capturing processing ends, otherwise the processing proceeds to step S313.

Processes in step S310 to step S312 are processes for the one-shot AF.

In step S310, the system control unit 50 determines whether the AF position is selected. In a case where the system control unit 50 determines that the AF position is selected, the processing proceeds to step S311, otherwise the process in step S310 is repeated.

In step S311, the system control unit 50 superimposes the AF frame indicating the position selected in step S310 with a transmittance of 0% on the live view image, which is then displayed on the display unit 28. FIG. 5G illustrates a display example of the AF frame in a case where the one-shot AF is set. An AF frame 511 indicates the AF position selected by the user.

In step S312, the system control unit 50 executes the focusing processing based on the AF position selected in step S310. As with step S306, the focusing processing in step S312 is performed more simply than the focusing processing to be executed by the half press of the shutter button 61 described above.

In step S313, the system control unit 50 determines whether the image capturing preparation instruction is provided by the half press of the shutter button 61. In a case where the system control unit 50 determines that the shutter button 61 is half-pressed, the processing proceeds to step S314, otherwise the processing proceeds to step S318.

In step S314, the system control unit 50 performs the focusing processing.

In step S315, the system control unit 50 superimposes the AF frame with a transmittance of 0% on the position at which focus is achieved in step S314 on the live view image, which is then displayed on the display unit 28. In step S315, the AF frame is displayed as illustrated in FIGS. 5A and 5B in the case of the continuous AF, and is displayed as illustrated in FIG. 5G in the case of the one-shot AF. In a case where the result of the determination in step S313 is Yes, and the focusing processing is executed, the AF frame may be displayed with a color different from those in step S311 as well as step S403 and step S453 to be described below. However, the AF frames each indicating the position at which focus is achieved are displayed in the same display form.

In step S316, the system control unit 50 determines whether the image capturing instruction is provided by the full press of the shutter button 61. In a case where the system control unit 50 determines that the shutter button 61 is full-pressed, the processing proceeds to step S317, otherwise the processing returns to step S313.

In step S317, the system control unit 50 performs the image capturing processing.

In step S318, the system control unit 50 performs determination similar to that in step S303, and the processing proceeds to step S304 in a case where the result is Yes, while the processing proceeds to step S310 in a case where the result is No.

Next, the display processing in the present exemplary embodiment will be described with reference to FIGS. 4A and 4B. The processing in FIGS. 4A and 4B is processing for displaying the in-focus frame in a normal state (a transmittance of 0%) for a distance measurement point continuously in focus, and displaying the in-focus frame in a display form (a transmittance of 30%) less conspicuous than the normal state, for a distance measurement point not continuously in focus but currently in focus. The processing in FIGS. 4A and 4B starts when the processing proceeds to step S308 in FIG. 3. The program recorded in the nonvolatile memory 56 is loaded into the system memory 52 and executed by the system control unit 50, so that this processing is implemented.

In step S401, the system control unit 50 determines whether an in-focus position n (a position included in the in-focus positions 1 to N) is an in-focus position at which focus is achieved last time. That is, the system control unit 50 determines whether the in-focus position n is also determined as an in-focus position in the last processing for displaying the in-focus frame (information indicating the in-focus position acquired last time). In other words, the system control unit 50 determines whether the in-focus position n is determined as an in-focus position twice in a row. Whether focus is achieved last time can be determined based on whether the last in-focus flag to be described below is ON. In a case where the system control unit 50 determines that the in-focus position n is the in-focus position at which focus is achieved last time, the processing proceeds to step S402, otherwise the processing proceeds to step S403. In other words, the processing proceeds to step S402 in a case where focus is achieved twice or more in a row, and the processing proceeds to step S403 in a case where focus is not achieved last time but achieved this time.

In step S402, the system control unit 50 superimposes the AF frame with a transmittance of 0% on the live view image, which is then displayed on the display unit 28. In FIG. 5C, AF frames 503, 505, and 507 each indicate the AF frame displayed with a transmittance of 0%. Further, in FIG. 5D, AF frames 503, 505, and 507 each indicate the AF frame displayed with a transmittance of 0%.

In step S403, the system control unit 50 superimposes the AF frame with a transmittance of 30% at the in-focus position n on the live view image, which is then displayed on the display unit 28. In FIG. 5C, AF frames 501a, 502a, 504a, 510a, and 506a each indicate the AF frame displayed with a transmittance of 30%. In FIG. 5D, AF frames 501a, 509a, 508a, 504a, and 506a each indicate the AF frame displayed with a transmittance of 30%.

In step S404, the system control unit 50 determines whether the display processing in step S402 or S403 is completed for all the in-focus positions 1 to N. In a case where the system control unit 50 determines that the display processing is completed for all the in-focus positions 1 to N, the processing proceeds to step S405, otherwise the processing returns to step S401.

In step S405, the system control unit 50 turns on the last in-focus flag for the in-focus positions 1 to N acquired in immediately preceding step S307 in FIG. 3, and records the change into the memory 32. The last in-focus flag indicates whether in-focus is determined in step S307 last time. This flag is used in processing for displaying the next in-focus frame (the next display frame) as in step S401.

In step S406, the system control unit 50 turns off the last in-focus flag for an out-of-focus position not achieving focus.

According to the exemplary embodiment described above, flickering when the AF frame is displayed can be reduced. This improves the visibility of the live view image for the user. When the visibility of the live view image improves, it is easy to understand the state of the subject, while grasping the position of the AF frame, and thus it is possible to concentrate on image capturing. When the AF frame of a transmittance of 0% is displayed at all the in-focus positions as illustrated in FIGS. 5A and 5B, AF frames 502, 508, 509, and 510 are displayed and not displayed. When display/non-display is thus switched frequently, the user notices flickering. The AF frame of a transmittance of 0% is displayed at the position at which focus is continuously achieved as in FIGS. 5C and 5D, and the AF frame where focus is not continuously achieved is displayed with a transmittance of 30% to be less conspicuous than the display with a transmittance of 0%. Flickering can be thereby reduced even if switching between display and non-display is repeated for some AF frames. The user can also grasp where a stably in-focus position is present.

In other words, in the present exemplary embodiment, in a case where, of two positions each determined as the in-focus position in the display at an N-th time in step S307, the first position is determined as the in-focus position in the display at an (N−1)-th time, and the second position is not determined as the in-focus position in the display at the (N−1)-th time, the following is performed. In other words, display with a transmittance of 0% is performed at the first position in the display at the N-th time, while display with a transmittance of 30% is performed at the second position in the display at the N-th time, i.e., the display forms are different even if the in-focus positions are the same.

Further, even if the distance measurement points are the same, in a case where focus is not achieved at an (N−2)-th time and focus is achieved at the (N−1)-th time, display with a transmittance of 30% is performed, but in a case where focus is achieved also at the subsequent N-th time, display with a transmittance of 0% is performed.

Next, a modification of the display processing in FIG. 4A will be described with reference to FIG. 4B. While displaying with a transmittance of 0% if focus is achieved twice in a row is described with reference to FIG. 4A, an example of displaying with a transmittance of 0% if focus is achieved four times or more in a row will be described with reference to FIG. 4B. The flowchart in FIG. 4B is similar to that in FIG. 4A except for a point to be described below. The processing in FIGS. 4A and 4B starts when the processing proceeds to step S308 in FIG. 3. The program recorded in the nonvolatile memory 56 is loaded into the system memory 52 and executed by the system control unit 50, so that this processing is implemented.

In step S451, the system control unit 50 determines whether the number of consecutive in-focus times A of the in-focus position n (the position included in the in-focus positions 1 to N) is 4 or more. The threshold of the number of consecutive in-focus times A for the determination in step S451 may be 3 or 5 (a predetermined number of times or more), instead of 4. In a case where the system control unit 50 determines that the number of consecutive in-focus times A for the in-focus position n is 4 or more, the processing proceeds to step S452, otherwise the processing proceeds to step S453. The number of consecutive in-focus times A is recorded in the memory 32.

In step S452, the system control unit 50 performs a process similar to step S402.

In step S453, the system control unit 50 performs a process similar to step S403.

In step S454, the system control unit 50 performs determination similar to step S404, and the processing proceeds to step S455 in a case where the result is Yes, while the processing returns to step S451 in a case where the result is No.

In step S455, the system control unit 50 sets the number of consecutive in-focus times A=A+1 for the in-focus positions 1 to N, and records this into the memory 32.

In step S456, the system control unit 50 sets A=0 for the out-of-focus position, and records this into the memory 32.

According to the modification described above, flickering when the AF frame is displayed can be reduced. This improves the visibility of the live view image for the user. In addition, display with a transmittance of 0% is not performed unless focus is achieved the number of times more than that in FIG. 4A in a row, and thus flickering is less likely to be conspicuous.

Figure 4A:
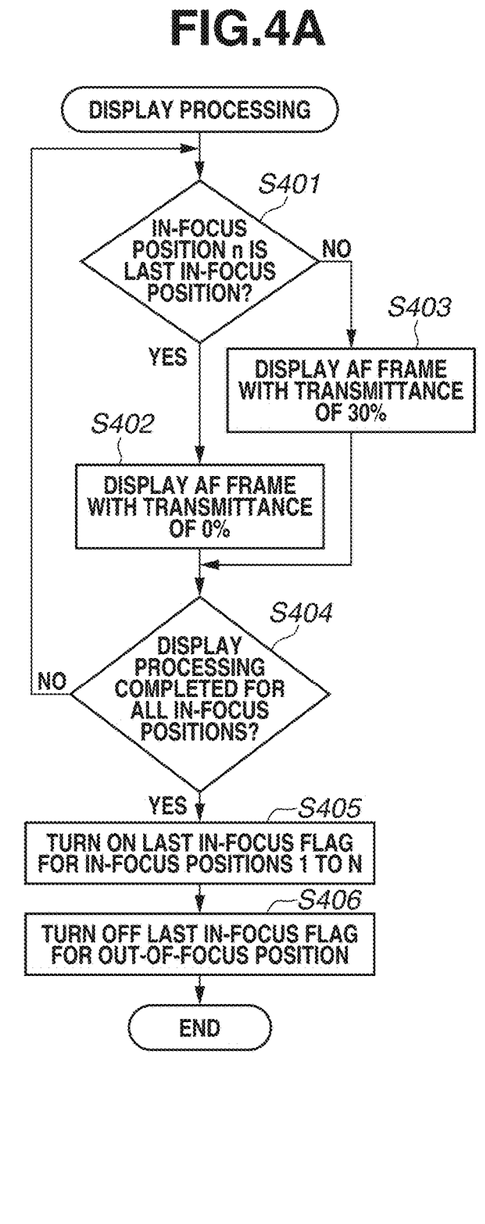
FIG. 4A is a flowchart of display processing in the exemplary embodiment of the disclosure.
Figure 4B:
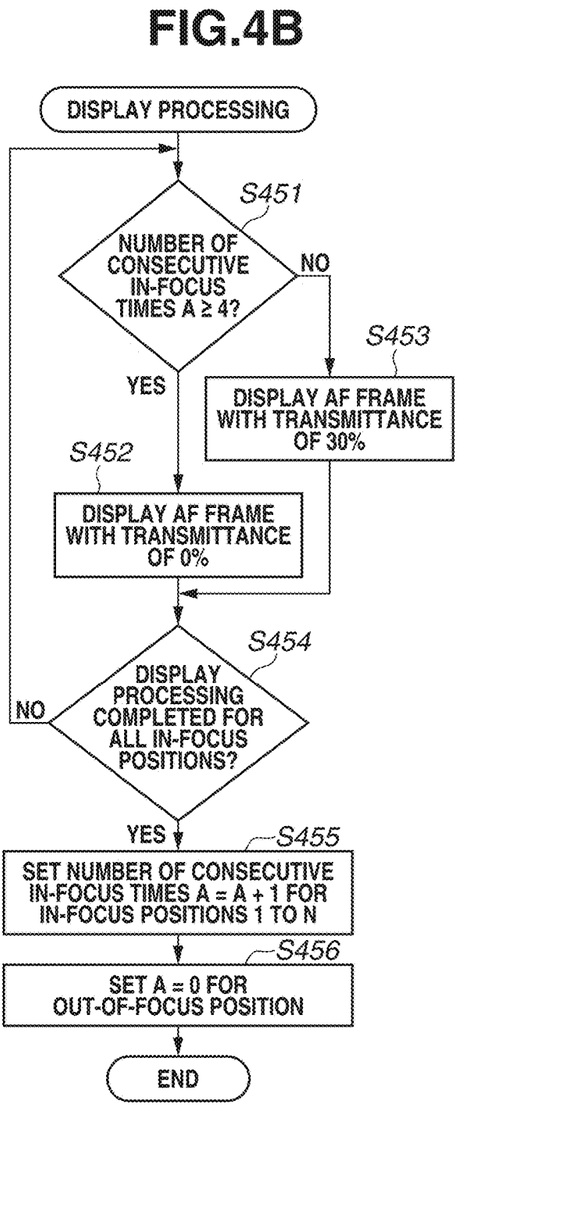
FIG. 4B is a flowchart illustrating a modification of the display processing in the exemplary embodiment of the disclosure.

Displaying the AF frame with a transmittance of 0% when focus is achieved twice or more in a row as in FIG. 4A and displaying the AF frame with a transmittance of 0% when focus is achieved four times or more in a row as in FIG. 4B may be switched depending on the movement of a subject. Further, the threshold for the determination in step S451 may be increased for a frequently moving subject. Furthermore, in the case of FIG. 4B, the transmittance may be gradually reduced according to the number of consecutive in-focus times. For example, a transmittance of 30% for twice in a row, a transmittance of 10% for three times in a row, and a transmittance of 0% for four times in a row may be adopted.

Further, in FIGS. 4A and 4B, it is also useful to display with a transmittance of 0% without performing the determination in step S401 and step S451, if the subject is the following subjects. For example, the face of a person, an animal, and an eye of a predetermined size or more (displayed in the area of half or more or one-third or more of the display unit 28) are such subjects. In the case of the face of a person of the predetermined size or more, it is likely that image capturing is performed mainly for this person. Therefore, it is better to be able to confirm that the face of the person is in focus even if the face flickers to some extent. This holds true for the case of an eye. In the case of an animal, it may be better to be able to confirm that focusing on the animal is successful, rather than to confirm at which position the animal is in focus, because the animal moves restlessly. In the detection of these subjects, the type of the subject is detected from a captured image in the system control unit 50.

Figure 5E:
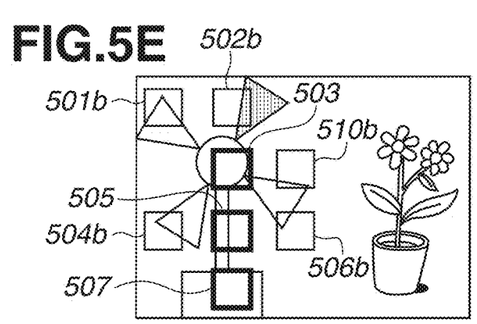
FIG. 5E is a diagram illustrating a display example for describing the exemplary embodiment of the disclosure.
Figure 5F:
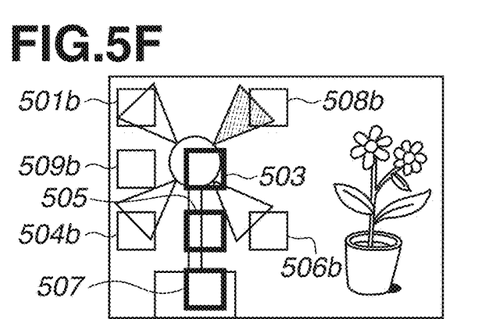
FIG. 5F is a diagram illustrating a display example for describing the exemplary embodiment of the disclosure.
Figure 5G:
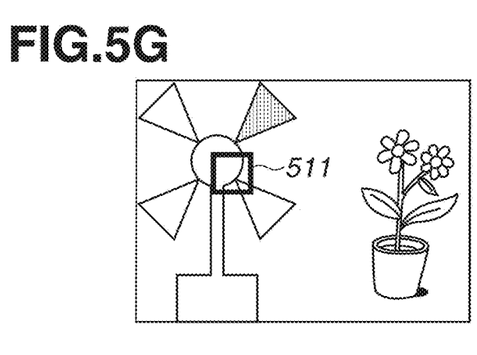
FIG. 5G is a diagram illustrating a display example for describing the exemplary embodiment of the disclosure.
Figure 5H:
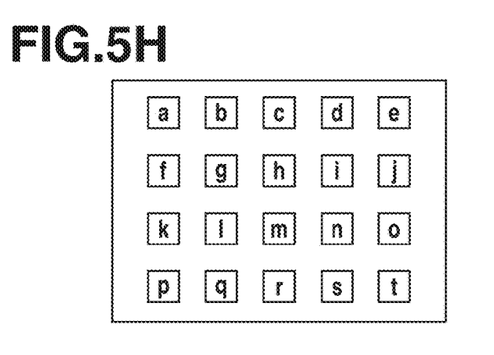
FIG. 5H is a diagram illustrating a display example for describing the exemplary embodiment of the disclosure.

The way of changing the display form of the AF frame includes not only increasing the transmittance, but also displaying the AF frame with a thin line as illustrated in FIGS. 5E and 5F. AF frames 501*b*, 502*b*, 504*b*, 510*b*, and 506*b* in FIG. 5E and AF frames 501*b*, 508*b*, 509*b*, 504*b*, and 506*b* in FIG. 5F are each displayed with a line thinner than that of the normal AF frames (503, 505, and 507). In other words, the area superimposed and displayed on the live view image is small. Flickering can be thereby reduced even if display/non-display is repeated.

In the above-described exemplary embodiment, for the distance measurement point not continuously in focus, displaying the AF frame with an increased transmittance or with a thinner line is described, but the display form of the AF frame is not limited thereto and may be a form to have a small area superimposed on the live view image, or to increase the visibility of the live view image (a region where the live view image is visible becomes larger or less conspicuous). In other words, it is acceptable to display the distance measurement point continuously in focus with a solid line, while displaying the distance measurement point not continuously in focus with a dotted line, or to display the distance measurement point continuously in focus with a red color, while displaying the distance measurement point not continuously in focus with a yellow color (a less-visible color). Moreover, the distance measurement point continuously in focus may be displayed at a higher luminance value than that for the distance measurement point not continuously in focus.

Further, the above-described exemplary embodiment may be performed in a case where the number of distance measurement points is a predetermined number or more, and otherwise the display form may remain unchanged even if focus is not continuously achieved. The larger the number of distance measurement points is, the more precisely the focusing situation can be grasped, but in a case where a subject moves, the focusing situation changes frequently and thus flickering is more conspicuous. When the number of distance measurement points is large, small AF frames appear and disappear, and thus flickering is conspicuous, but flickering can be reduced according to the present exemplary embodiment.

In the above-described exemplary embodiment, the display form of the AF frame is described to be controlled depending on whether the distance measurement point is continuously in focus, but the condition for changing the display form is not limited thereto. For example, the display form of the AF frame may be controlled depending on the frequency of achieving focus (in-focus frequency) within a unit time. In a case where the in-focus frequency is lower than a threshold, the transmittance of the AF frame may be higher or the line of the AF frame may be thinner than that for a distance measurement point at which the in-focus frequency is more than or equal to the threshold. The relationship between the in-focus frequency and the display form of the AF frame is not limited to the one describe above, and the display form of the AF frame may be gradually changed depending on the in-focus frequency using a plurality of thresholds. Further, the transmittance of the AF frame or the line thickness of the AF frame may be continuously changed depending on the in-focus frequency.

One piece of hardware may perform the various kinds of control described above to be performed by the system control unit 50, or a plurality of pieces of hardware may control the entire apparatus by sharing the processing.

While the disclosure is described in detail based on exemplary embodiments thereof, the disclosure is not limited to these specific exemplary embodiments, and also includes various embodiments within a scope not deviating from the gist of the invention. Further, each of the exemplary embodiments described above is only an exemplary embodiment of the disclosure, and the exemplary embodiments can also be appropriately combined.

Further, in the exemplary embodiment described above, the case where the disclosure is applied to the digital camera 100 is described as an example, but the disclosure is not limited thereto, and is applicable to a display control apparatus if the display control apparatus can superimpose and display an AF frame on a live view image. In other words, the disclosure is applicable to a mobile phone terminal, a portable image viewer, a printer apparatus with a finder, a digital photo frame, a music player, a game console, an electronic book reader, and the like.

The disclosure is not limited to the above-described embodiments, and various modifications and changes can be made within the spirit and scope of the disclosure. Therefore, the following claims are attached to make the scope of the disclosure public.

According to the disclosure, the visibility of a live view image in displaying an AF frame can be improved.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A display control apparatus comprising:
at least one processor; and
a memory coupled to the at least one processor, the memory having instructions that, when executed by the processor, causes the at least one processor to function as:
an acquisition unit configured to acquire information about an in-focus position on a live view image; and
a display control unit configured to perform control to display an item indicating the in-focus position on the live view image, based on the acquired information,
wherein the display control unit performs control to display a first item at a first in-focus position at which focus is continuously achieved, in a display form having higher visibility than in a display form of a second item to be displayed at a second in-focus position at which focus is not achieved at least last time, and
wherein display control unit superimposes an auto focus (AF) frame with a percent of transmittance, and wherein the percent of transmittance depends on whether or not the in-focus position is achieved at least the last time.

2. The display control apparatus according to claim 1, wherein the first in-focus position is a position at which focus is achieved when the information is acquired by the acquisition unit last time, and the second in-focus position is a position at which focus is not achieved when the information is acquired by the acquisition unit last time.

3. The display control apparatus according to claim 1, wherein the position at which focus is continuously achieved is a position at which focus is achieved greater than or equal to a predetermined number of times in a row.

4. The display control apparatus according to claim 1, wherein the second item is displayed in a display form of any one of a higher transmittance, a thinner line, and a lower luminance than in the display form of the first item.

5. The display control apparatus according to claim 1, wherein the display control unit performs control to change the display form of the first item based on a number of consecutive in-focus times.

6. The display control apparatus according to claim 1, wherein the at least one processor further functions as a setting unit configured to set continuous AF of tracking a selected subject and to perform focusing processing, wherein the display control unit performs control, in a case where the continuous AF is set by the setting unit, to make the display form of the first item to be displayed at the first in-focus position and the display form of the second item to be displayed at the second in-focus position different.

7. The display control apparatus according to claim 1, wherein the at least one processor further functions as a setting unit configured to set continuous AF of tracking a selected subject and to perform focusing processing, wherein the display control unit performs control, in a case where the continuous AF is set by the setting unit, to change the display form of the first item based on a number of consecutive in-focus times.

8. The display control apparatus according to claim 1, wherein a flag is attached to an in-focus position based on information acquired by the acquisition unit at an N-th time, and
wherein the display control unit performs control to display the first item at the in-3-focus position to which the flag is attached, among in-focus positions based on information acquired by the acquisition unit at an (N+1)-th time immediately after the N-th time.

9. The display control apparatus according to claim 1, wherein a number of in-focus times for the in-focus position is incremented, in a case where an in-focus position based on information acquired by the acquisition unit at an N-th time is a position at which focus is achieved also at an (N+1)-th time immediately after the N-th time, and
wherein the display control unit performs control to display the first item at the in-focus position in response to the number of in-focus times becoming greater than or equal to a predetermined number.

10. The display control apparatus according to claim 1, wherein the at least one processor further functions as a selection unit configured to select a subject to be brought into focus,
wherein the display control unit performs control to display the item indicating the in-focus position to be in a display form independent of whether focus is continuously achieved, in a case where the selection unit selects any one of a face of a person, an animal, and an eye.

11. A computer readable recording medium storing a program for causing a computer to function as each unit of the display control apparatus according to claim 1.

12. A control method of a display control apparatus, the method comprising:
acquiring information about an in-focus position on a live view image; and
performing control to display an item indicating the in-focus position on the live view image, based on the acquired information,
wherein, in the performing control to display, a first item displayed at a first in-focus position at which focus is continuously achieved is controlled to be in a display form having higher visibility than in a display form of a second item to be displayed at a second in-focus position at which focus is not achieved at least last time,
wherein display control unit superimposes an auto focus (AF) frame with a percent of transmittance, and
wherein the percent of transmittance depends on whether or not the in-focus position is achieved at least the last time.

* * * * *